United States Patent
Chen (10) Patent No.: US 12,401,947 B2
(45) Date of Patent: Aug. 26, 2025

(54) MULTI-DEVICE AUDIO PLAYBACK CORRECTION METHOD AND DEVICE

(71) Applicant: JRD COMMUNICATION (SHENZHEN) LTD., Guangdong (CN)

(72) Inventor: Yichong Chen, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 286 days.

(21) Appl. No.: 17/905,168

(22) PCT Filed: Apr. 8, 2020

(86) PCT No.: PCT/CN2020/083708
§ 371 (c)(1),
(2) Date: Aug. 27, 2022

(87) PCT Pub. No.: WO2021/168997
PCT Pub. Date: Sep. 2, 2021

(65) Prior Publication Data
US 2023/0116128 A1    Apr. 13, 2023

(30) Foreign Application Priority Data
Feb. 28, 2020 (CN) .......................... 202010128862.8

(51) Int. Cl.
*H04R 3/12* (2006.01)
*G10L 21/0208* (2013.01)
(Continued)

(52) U.S. Cl.
CPC ...... *H04R 3/12* (2013.01); *G10L 2021/02082* (2013.01); *G11B 27/10* (2013.01);
(Continued)

(58) Field of Classification Search
CPC ...... H04S 7/301; H04N 21/4307; H04R 3/12; H04R 2420/07; H04W 4/80; G11B 27/10; G11B 31/00
See application file for complete search history.

(56) References Cited

U.S. PATENT DOCUMENTS

2003/0023331 A1 * 1/2003 Komura .................. H04S 1/00
700/94
2008/0175395 A1 * 7/2008 Rice ....................... H04R 5/04
381/2
(Continued)

FOREIGN PATENT DOCUMENTS

| CN | 102387171 A | 3/2012 |
| CN | 104703092 A | 6/2015 |

(Continued)

OTHER PUBLICATIONS

International Search Report in International application No. PCT/CN2020/083708, mailed on Dec. 2, 2020.
(Continued)

*Primary Examiner* — Carolyn R Edwards
*Assistant Examiner* — Kuassi A Ganmavo
(74) *Attorney, Agent, or Firm* — PV IP PC; Wei Te Chung (57) ABSTRACT

A multi-device audio playback correction method includes: connecting to a plurality of playback devices, and assigning a corresponding sound channel to each of the playback devices; transmitting superimposed audio signals to the playback devices, and recording one or more start transmitting time points corresponding to the playback devices; receiving audio playback signals transmitted by the playback devices, and recording receiving time points corresponding to the playback devices; obtaining a transmission delay sequence corresponding to the playback devices by subtracting the one or more start transmitting time points
(Continued)

from the receiving time points; and correcting an audio playback time of each of the playback devices according to the transmission delay sequence. A multi-device audio playback correction device is also further provided.

20 Claims, 2 Drawing Sheets

(51) Int. Cl.
    *G11B 27/10*     (2006.01)
    *G11B 31/00*     (2006.01)
    *H04N 21/43*     (2011.01)
    *H04S 7/00*     (2006.01)
    *H04W 4/80*     (2018.01)

(52) U.S. Cl.
    CPC .......... *G11B 31/00* (2013.01); *H04N 21/4307* (2013.01); *H04R 2420/07* (2013.01); *H04S 7/301* (2013.01); *H04W 4/80* (2018.02)

(56) References Cited

U.S. PATENT DOCUMENTS

| | | | | |
|---|---|---|---|---|
| 2011/0116641 A1* | 5/2011 | Bergere | .................... | H04S 3/00 |
| | | | | 381/17 |
| 2012/0300958 A1* | 11/2012 | Klemmensen | ....... | H04R 29/008 |
| | | | | 381/81 |
| 2014/0003611 A1* | 1/2014 | Mohammad | ............. | H04B 3/20 |
| | | | | 381/66 |
| 2014/0094944 A1* | 4/2014 | Morcelli | ............ | H04N 21/4325 |
| | | | | 700/94 |
| 2014/0172435 A1* | 6/2014 | Thiergart | .............. | G10L 19/018 |
| | | | | 704/500 |
| 2017/0126801 A1* | 5/2017 | Tan | ........................ | H04L 67/303 |
| 2017/0257722 A1* | 9/2017 | Kerdranvat | ............. | H04S 3/002 |
| 2017/0262255 A1* | 9/2017 | Shih | ......................... | G06F 3/165 |
| 2018/0003796 A1* | 1/2018 | Yang | ......................... | G01S 5/30 |
| 2018/0242095 A1* | 8/2018 | Patil | ......................... | H04S 7/301 |
| 2019/0220241 A1* | 7/2019 | Yu | ........................... | G11B 27/10 |
| 2019/0253801 A1* | 8/2019 | Arteaga | ................. | H04R 5/027 |
| 2019/0297589 A1* | 9/2019 | Boehlke | ................. | H04R 27/00 |
| 2019/0387320 A1* | 12/2019 | Sakai | ....................... | H04R 3/12 |
| 2020/0264838 A1* | 8/2020 | Yu | ......................... | H04W 4/023 |

FOREIGN PATENT DOCUMENTS

| | | |
|---|---|---|
| CN | 105338393 A | 2/2016 |
| CN | 205283753 U | 6/2016 |
| CN | 105992040 A | 10/2016 |
| CN | 106411448 A | 2/2017 |
| CN | 107124674 A | 9/2017 |
| CN | 108449630 A | 8/2018 |
| CN | 109219008 A | 1/2019 |

OTHER PUBLICATIONS

Written Opinion of the International Search Authority in International application No. PCT/CN2020/083708, mailed on Dec. 2, 2020.

Chinese Office Action issued in corresponding Patent Application No. 202010128862.8 dated Nov. 10, 2020, pp. 1-8.

* cited by examiner

MULTI-DEVICE AUDIO PLAYBACK CORRECTION METHOD AND DEVICE

CROSS REFERENCE TO RELATED APPLICATIONS

This application is a US national phase application based upon an International Application No. PCT/CN2020/083708, filed on Apr. 8, 2020, which claims the priority of Chinese Patent Application No. 202010128862.8, entitled "MULTI-DEVICE AUDIO PLAYBACK CORRECTION METHOD AND DEVICE AND TERMINAL THEREOF", filed on Feb. 28, 2020 in the China National Intellectual Property Administration (CNIPA), the contents of which is are incorporated herein by reference in its their entirety.

TECHNICAL FIELD

The present disclosure relates to the mobile communication technology field, and more particularly to a multi-device audio playback correction method and device.

BACKGROUND ART

With the development of science and technology, functions of mobile terminals are gradually increasing, and more and more users use the mobile terminals to play music. However, due to a limitation of a size of a mobile terminal, an external speaker of the mobile terminal is generally small, and sound playback effect is often not good. Accordingly, when the mobile terminal is used to play music, it often connects to an external audio playback device, such as a BLUETOOTH speaker, earphones or the like. However, at present, they are mainly one-to-one, that is, a mobile terminal connects to a BLUETOOTH speaker device. Although better audio effect can be obtained, the effect is still not ideal when compared to a traditional sound channel device. Therefore, it is necessary to connect the mobile terminal to a plurality of BLUETOOTH playback devices to improve the audio effect. During the research and practice of the prior art, the inventor of the present disclosure found that when the mobile terminal connects to a plurality of BLUETOOTH speakers, a problem of out-of-sync audio playback occurs due to reasons including signal transmission delays, distances between the devices and so on.

Technical Problem

Embodiments of the present disclosure provide a multi-device audio playback correction method and device. Transmission delays of audio signals and playback devices are obtained by ultrasonic signals superimposed into the audio signals. The playback devices can play audio simultaneously by delaying one or more start transmitting time points of the audio signals.

Technical Solution

In a first aspect, an embodiment of the present disclosure provides a multi-device audio playback correction method including:
  connecting to a plurality of playback devices, and assigning a corresponding sound channel to each of the playback devices;
  transmitting superimposed audio signals to the playback devices, and recording one or more start transmitting time points corresponding to the playback devices;
  receiving audio playback signals transmitted by the playback devices, and recording receiving time points corresponding to the playback devices;
  obtaining a transmission delay sequence corresponding to the playback devices by subtracting the one or more start transmitting time points from the receiving time points; and
  correcting an audio playback time of each of the playback devices according to the transmission delay sequence.

Optionally, in some embodiments of the present disclosure, the transmitting the superimposed audio signals to the playback devices includes:
  superimposing ultrasonic signals into audio signals transmitted to the playback devices to be the superimposed audio signals; and
  transmitting the superimposed audio signals to the playback devices in a time-sharing manner.

Optionally, in some embodiments of the present disclosure, the receiving the audio playback signals transmitted by the playback devices, and the recording the receiving time points corresponding to the playback devices include:
  in each time slice, receiving one of the audio playback signals transmitted by a corresponding one of the playback devices, separating a corresponding one of the audio signals and a corresponding one of the ultrasonic signals, and recording the receiving time of the one of the playback devices.

Optionally, in some embodiments of the present disclosure, the obtaining the transmission delay sequence corresponding to the playback devices by subtracting the one or more start transmitting time points from the receiving time points includes:
  in each time slice, obtaining the transmission delay sequence corresponding to the playback devices by subtracting the one or more start transmitting time points from the receiving time points; and
  confirming that the receiving time points corresponding to all the playback devices are obtained, and obtaining the transmission delay sequence corresponding to the playback devices by subtracting the one or more start transmitting time points from the receiving time points.

Optionally, in some embodiments of the present disclosure, the transmitting the superimposed audio signals to the playback devices includes:
  transmitting the superimposed audio signals to the playback devices simultaneously.

Optionally, in some embodiments of the present disclosure, the transmitting the superimposed audio signals to the playback devices simultaneously includes:
  obtaining audio signals transmitted to the playback devices;
  superimposing ultrasonic signals with different frequencies into audio signals to be the superimposed audio signals; and
  transmitting the superimposed audio signals to the playback devices simultaneously.

Optionally, in some embodiments of the present disclosure, the receiving the audio playback signals transmitted by the playback devices, and the recording the receiving time points corresponding to the playback devices include:
  separating the ultrasonic signals superimposed into the audio playback signal according to the frequencies;
  obtaining the receiving time points corresponding to the ultrasonic signals with the different frequencies; and
  recording the receiving time points corresponding to the playback devices according to the ultrasonic signals superimposed into the audio signals.

Optionally, in some embodiments of the present disclosure, the correcting the audio playback time of each of the playback devices according to the transmission delay sequence includes:
- comparing transmission delays in the transmission delay sequence;
- obtaining a maximum transmission delay in the transmission delay sequence;
- calculating a difference value between each of the transmission delays included in the transmission delay sequence and the maximum transmission delay; and
- delaying time of transmitting each audio signal to the playback devices according to the difference value.

In a second aspect, an embodiment of the present disclosure further provides a multi-device audio playback correction device including:
- a connecting unit configured to connect to a plurality of playback devices and assign a corresponding sound channel to each of the playback devices;
- a signal superimposing and transmitting unit configured to transmit superimposed audio signals to the playback devices and record one or more start transmitting time points corresponding to the playback devices;
- a receiving unit configured to receive audio playback signals transmitted by the playback devices and record receiving time points corresponding to the playback devices;
- a calculating unit configured to obtain a transmission delay sequence corresponding to the playback devices by subtracting the one or more start transmitting time points from the receiving time points; and
- a correcting unit configured to correct an audio playback time of each of the playback devices according to the transmission delay sequence.

Advantageous Effects

Embodiments of the present disclosure provide a multi-device audio playback correction method and device. A mobile terminal connects to a plurality of playback devices, assigns a corresponding sound channel to each of the playback devices, transmits superimposed audio signals to the playback devices, records one or more start transmitting time points corresponding to the playback devices, receives audio playback signals transmitted by the playback devices, records receiving time points corresponding to the playback devices, obtains a transmission delay sequence corresponding to the playback devices by subtracting the one or more start transmitting time points from the receiving time points, compares transmission delays in the transmission delay sequence, obtains a maximum transmission delay in the transmission delay sequence, and delays time of transmitting each audio signal to the playback devices according to a difference value between each of the transmission delays included in the transmission delay sequence and the maximum transmission delay, thereby correcting an audio playback time of each of the playback devices to achieve effect of simultaneously playing audio by the playback devices.

DETAILED DESCRIPTION OF EMBODIMENTS

Embodiments of the present disclosure provide a multi-device audio playback correction method and device. The device can be integrated in a terminal, and the terminal can be a mobile phone, a tablet computer, a notebook computer, a smart watch or the like.

Figure 1:
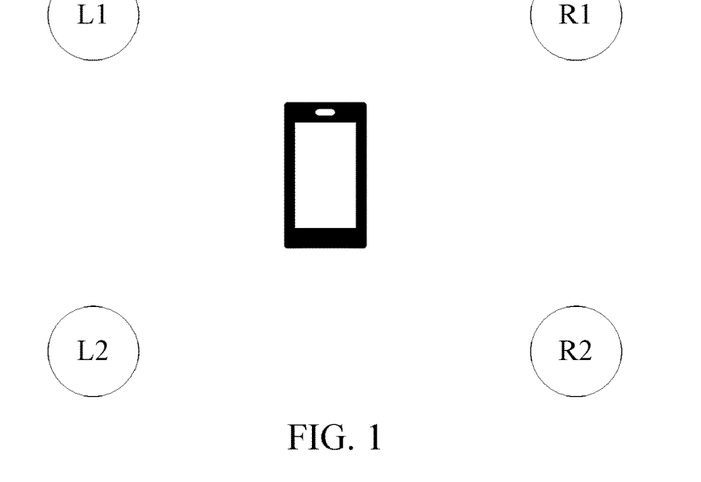
FIG. 1 illustrates a schematic diagram of a multi-device audio playback correction scenario provided by an embodiment of the present disclosure.

For example, as shown in FIG. 1, in order to make audio playback effect better, a mobile terminal connects to four playback devices (L1, L2, R1, and R2) to play audio together. The mobile terminal connects to the four playback devices through BLUETOOTH and assigns a corresponding sound channel to each of the playback devices. The mobile terminal transmits audio signals to the corresponding playback devices. Due to transmission delays of the signals and distances between the playback devices and the mobile terminal, time lengths of receiving and playing the audio signals by the playback devices are different. Accordingly, the mobile terminal superimposes ultrasonic signals into the audio signals to be superimposed audio signals, transmits the superimposed audio signals to the corresponding playback devices, and records one or more start transmitting time points at the same time. After the playback devices receive the audio signals and play audio, the mobile terminal receives audio playback signals transmitted by the playback devices and records receiving time points corresponding to the playback devices. Then, a transmission delay sequence corresponding to the playback devices is obtained by subtracting the one or more start transmitting time points from the receiving time points. A maximum transmission delay in the transmission delay sequence is obtained by comparing all transmission delays in the transmission delay sequence. A difference value between each of the other transmission delays in the transmission delay sequence and the maximum transmission delay is calculated. The mobile terminal delays time of transmitting each of the audio signals to the playback devices according to the difference value, so that the playback devices receive the audio signals at the same time and the audio is played at the same time. A problem of out-of-sync audio playback occurs due to reasons including signal transmission delays, distances between the devices and so on can be avoided.

Details will be described as follows. It should be noted that a description order of the following embodiments is not intended to limit a preferred order of the embodiments.

The present embodiment will be described from the perspective of a multi-device audio playback correction device. The multi-device audio playback correction device can be specifically integrated in a terminal device, and the terminal device can include a notebook computer, a tablet computer, a smart phone, a smart watch or the like.

The multi-device audio playback correction method includes: connecting to a plurality of playback devices, and assigning a corresponding sound channel to each of the playback devices; transmitting superimposed audio signals to the playback devices, and recording one or more start transmitting time points corresponding to the playback devices; receiving audio playback signals transmitted by the playback devices, and recording receiving time points corresponding to the playback devices; obtaining a transmission delay sequence corresponding to the playback devices by subtracting the one or more start transmitting time points from the receiving time points; and correcting an audio playback time of each of the playback devices.

Figure 2:
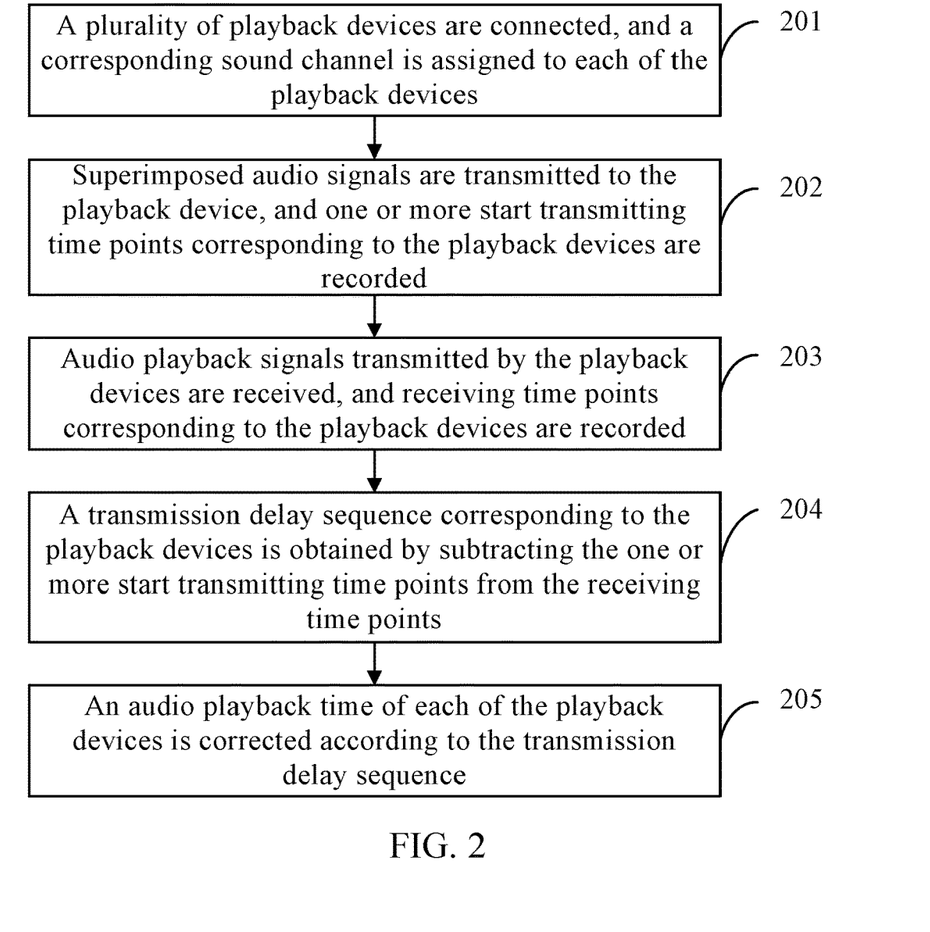
FIG. 2 illustrates a flowchart of a multi-device audio playback correction method provided by an embodiment of the present disclosure.

As shown in FIG. 2, a specific process of the multi-device audio playback correction method is as follows.

In step 201, a plurality of playback devices are connected, and a corresponding sound channel is assigned to each of the playback devices.

For example, due to a limitation of a size of a mobile terminal, a speaker is generally small. When the mobile terminal is used to play audio, the mobile terminal connects to the plurality of playback devices to obtain better playback effect, and the corresponding sound channels are assigned to the playback devices at the same time to transmit audio signals to be played to the playback devices.

The sound channels refer to independent audio signals collected or played back at different spatial positions when sounds are recorded or played. Accordingly, a number of the sound channels is a number of sound sources when the sounds are recorded or a corresponding number of speakers during a playback.

Optionally, the mobile terminal generally connects to the playback devices through BLUETOOTH, so that the playback devices play the audio in the mobile terminal.

In step 202, superimposed audio signals are transmitted to the playback device, and one or more start transmitting time points corresponding to the playback devices are recorded.

Figure 3:
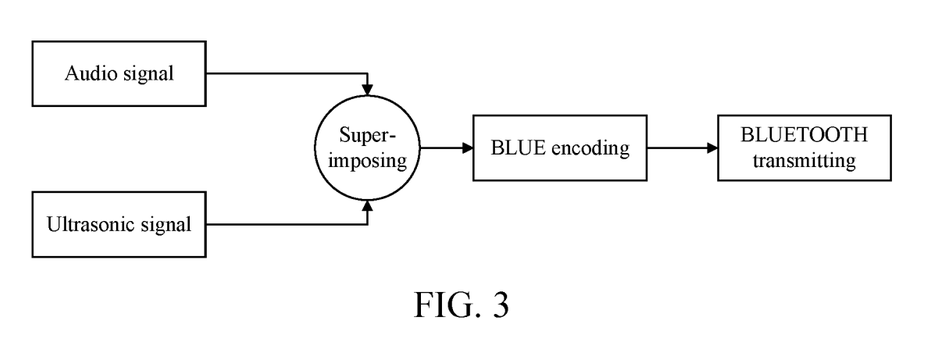
FIG. 3 illustrates a schematic diagram of transmitting superimposed audio signals by a mobile terminal provided by an embodiment of the present disclosure.

Please refer to FIG. 2 and FIG. 3 together. The mobile terminal superimposes ultrasonic signals into the audio signals to be the superimposed audio signals, performs BLUETOOTH encoding on the superimposed audio signals, transmits them to the corresponding playback devices connected to the mobile terminal through BLUETOOTH, and records the corresponding one or more start transmitting start time points of the playback devices.

An ultrasonic is a sound wave with a frequency higher than 20,000 Hz. It has good directionality and strong reflection ability, obtains concentrated sound energy easily, and travels far in water. It can be used for distance measurement, speed measurement, cleaning, welding, crushing stone, sterilization, disinfection and so on. There are many applications in medicine, military, industry and agriculture. A lower frequency limit of the ultrasonic is greater than an upper limit of human hearing.

Optionally, there are two methods of transmitting the superimposed audio signals to the playback devices connected to the mobile terminal. One is that the mobile terminal transmits the superimposed audio signals to the playback devices in a time-sharing manner. That is, the mobile terminal sequentially transmits the superimposed audio signals to all the playback devices in different time slices. In one of the time slices, the mobile terminal exchanges data with only one of the playback devices. The mobile terminal superimposes one of the ultrasonic signals into a corresponding one of the audio signals transmitted to the one of the playback devices to generate a corresponding one of the superimposed audio signals. The mobile terminal transmits the corresponding one of the superimposed audio signals to the one of the playback devices and records a corresponding one of the start transmitting time points corresponding to the one of the playback devices. After receiving the corresponding one of the superimposed audio signals transmitted by the mobile terminal, the one of the playback devices plays the audio signal, so that the mobile terminal receives the audio playback signal and records the receiving time point corresponding to the one of the playback devices. Then, a next time slice starts, the mobile terminal exchanges data with another of the playback devices.

The ultrasonic signals superimposed into the audio signals transmitted to the different playback devices can be the same or different from each other. Superimposed ultrasonic waves in the superimposed audio signals corresponding to several of the playback devices can be the same, and these ultrasonic waves can be different from superimposed ultrasonic waves in the superimposed audio signals corresponding to the other playback devices. The superimposed ultrasonic waves in the superimposed audio signals corresponding to the different playback devices can be ultrasonic waves with the same frequency or can be ultrasonic waves with different frequencies, can be ultrasonic waves with a single frequency or can be ultrasonic waves with multiple frequencies, and can be ultrasonic waves with the same amplitude or can be ultrasonic waves with different amplitudes.

Optionally, the other method of transmitting the superimposed audio signals to the playback devices connected to the mobile terminal is that the mobile terminal simultaneously transmits the superimposed audio signals to all the playback devices. The mobile terminal superimposes the ultrasonic signals into the audio signal transmitted to the playback devices to be the superimposed audio signals. Frequencies of the ultrasonic signals superimposed into the audio signals transmitted to the different playback devices are different. That is, the frequencies of the ultrasonic signals transmitted to the playback devices are different from each other. The ultrasonic signals can have a single frequency or multiple frequencies. At the same time, the mobile terminal records the frequencies of the ultrasonic signals corresponding to the playback devices. Then, the mobile terminal simultaneously transmits the superimposed audio signals to all the playback devices connected to the mobile terminal and records the one start transmitting time point.

In step 203, audio playback signals transmitted by the playback devices are received, and receiving time points corresponding to the playback devices are recorded.

Figure 4:
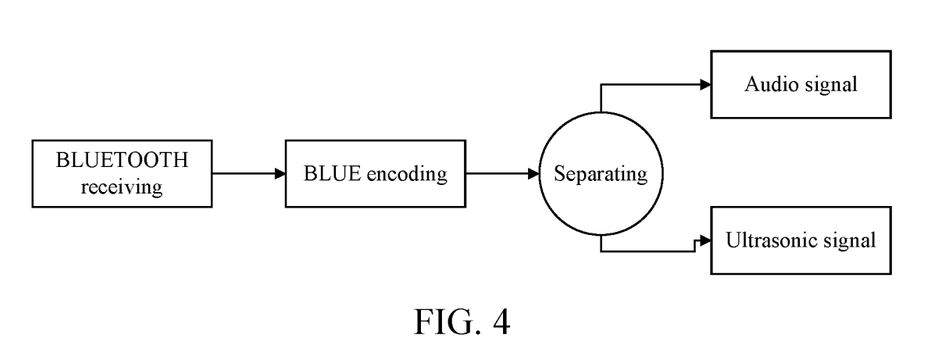
FIG. 4 illustrates a schematic diagram of receiving audio playback signals by the mobile terminal provided by an embodiment of the present disclosure.

For example, please refer to FIG. 2 and FIG. 4 together. The playback devices receive the superimposed audio signals transmitted by the mobile terminal and play audio. The mobile terminal receives the audio playback signals through BLUETOOTH, so that a microphone can collect the audio playback signals of the playback devices. Then, the mobile terminal performs BLUETOOTH encoding on the audio playback signals. The mobile terminal separates the audio signals and the ultrasonic signals from the audio playback signals and records the receiving time points of the ultrasonic signals corresponding to the playback devices.

Optionally, since the mobile terminal has two methods of transmitting the superimposed audio signals to the playback devices connected to the mobile terminal, the mobile terminal also has two methods of receiving the audio playback signals transmitted by the playback devices. When the mobile terminal transmits the superimposed audio signals to the playback devices in the time-sharing manner, in one of the time slices, the mobile terminal transmits one of the superimposed audio signals to a corresponding one of the playback devices and records the start transmitting time point of the corresponding one of the playback devices. After the corresponding one of the playback devices receives the one of the superimposed audio signals transmitted by the mobile terminal and plays the audio, the mobile terminal receives a corresponding one of the audio playback signals played by the corresponding one of the playback devices in the one of the time slices. Then, the mobile terminal separates a corresponding one of the audio signals and a corresponding one of the ultrasonic signals from the corresponding one of the audio playback signals, and records the receiving time point of the one of the ultrasonic signals corresponding to the one of the playback devices. Then, the mobile terminal enters a next time slice to transmit another superimposed audio signal to another playback device. The above-mentioned steps are repeated until the start transmitting time points of all the playback devices and the receiving time points of the ultrasonic signals in the audio playback signals of all the playback devices are recorded.

Optionally, when the mobile terminal simultaneously transmits the superimposed audio signals to the playback devices, the mobile terminal superimposes the ultrasonic signals into the audio signals transmitted to the playback devices to be the superimposed audio signals. Then, the mobile terminal simultaneously transmits the superimposed audio signals to all the playback devices connected to the mobile terminal. The playback devices receive the superimposed audio signals transmitted by the mobile terminal and play the audio. Due to reasons including signal transmission delays, distances between the devices and so on, the mobile terminal successively receives the audio playback signals of the playback devices. Then, the mobile terminal obtains the receiving time points corresponding to the ultrasonic signals with the different frequencies by separating the superimposed ultrasonic signals in the audio playback signals according to the differences of the frequencies, and obtains the receiving time points of the ultrasonic signals corresponding to all the playback devices according to the audio signals of the playback devices into which the ultrasonic signals with the different frequencies are superimposed.

In step 204, a transmission delay sequence corresponding to the playback devices is obtained by subtracting the one or more start transmitting time points from the receiving time points.

For example, the one or more start transmitting time points of the superimposed audio signals corresponding to the playback devices are matched to the receiving time points of the ultrasonic signals superimposed into the audio playback signals. Then, transmission delays corresponding to all the playback devices are obtained by subtracting the one or more start transmitting time points from the matched receiving time points, thereby obtaining the transmission delay sequence corresponding to all the playback devices.

Optionally, when the mobile terminal transmits the superimposed audio signals to the playback devices in the time-sharing manner, in one of the time slices, the mobile terminal transmits one of the superimposed audio signals to a corresponding one of the playback devices and records the start transmitting time point of the corresponding one of the playback devices. The mobile terminal receives a corresponding one of the audio playback signals played by the corresponding one of the playback devices. Then, the mobile terminal separates a corresponding one of the audio signals and a corresponding one of the ultrasonic signals from the corresponding one of the audio playback signals, and records the receiving time point of the one of the ultrasonic signals corresponding to the one of the playback devices. In the one of the time slices, the mobile terminal obtains a transmission delay by subtracting the start transmitting time point form the receiving time point. Then, the mobile terminal enters a next time slice. The mobile terminal transmits another superimposed audio signal to another playback device, records the start transmitting time point of another playback device, and receives a corresponding one of the audio playback signals at the same time. Then, the mobile terminal separates a corresponding one of the audio signals and a corresponding one of the ultrasonic signals from the corresponding one of the audio playback signals, and records the receiving time point of the one of the ultrasonic signals corresponding to another playback device. A transmission delay by subtracting the start transmitting time point form the receiving time point is obtained. The above-mentioned steps are repeated until the transmission delay sequence corresponding to the playback devices is obtained.

Optionally, when the mobile terminal transmits the superimposed audio signals to the playback devices in the time-sharing manner, in one of the time slices, the mobile terminal transmits one of the superimposed audio signals to a corresponding one of the playback devices and records the start transmitting time point of the corresponding one of the playback devices. The mobile terminal receives a corresponding one of the audio playback signals played by the corresponding one of the playback devices. Then, the mobile terminal separates a corresponding one of the audio signals and a corresponding one of the ultrasonic signals from the corresponding one of the audio playback signals, and records the receiving time point of the one of the ultrasonic signals corresponding to the one of the playback devices. Then, the mobile terminal enters a next time slice. The mobile terminal transmits another superimposed audio signal to another playback device, records the start transmitting time point of another playback device, and receives a corresponding one of the audio playback signals at the same time. Then, the mobile terminal separates a corresponding one of the audio signals and a corresponding one of the ultrasonic signals from the corresponding one of the audio playback signals, and records the receiving time point of the one of the ultrasonic signals corresponding to another playback device. The above-mentioned steps are repeated until the one or more start transmitting time points and the receiving time points of the ultrasonic signals superimposed into the audio playback signals of all the playback devices are recorded. Then, the transmission delay sequence corresponding to the playback devices is obtained by subtracting the one or more start transmitting time points from the receiving time points according to the one or more start transmitting time points and the matched receiving time points.

Optionally, when the mobile terminal simultaneously transmits the superimposed audio signals to the playback devices, the mobile terminal simultaneously transmits the superimposed audio signals to all the playback devices connected to the mobile terminal and records the start transmitting time point. The mobile terminal successively receives the audio playback signals of the playback devices, obtains the receiving time points of all the playback devices according to the audio signals of the playback devices into which the ultrasonic signals with the different frequencies are superimposed, and matches the start transmitting time point of the superimposed audio signals corresponding to the playback devices to the receiving time points of the ultrasonic signals superimposed into the audio playback signals. Then, the transmission delay sequence of all the playback devices is obtained by obtaining the transmission delay corresponding to each of the playback devices.

In step 205, an audio playback time of each of the playback devices is corrected according to the transmission delay sequence.

For example, the mobile terminal obtains the transmission delay sequence of all the playback devices, obtains a maximum transmission delay in the transmission delay sequence by comparing all the transmission delays included in the transmission delay sequence, and obtains a difference value of each of the playback devices between each of the other transmission delays and the maximum transmission delay by calculating a difference value between each of the other transmission delays in the transmission delay sequence and the maximum transmission delay. Then, the mobile terminal delays time of transmitting each of the audio signals to the playback devices according to the difference value, so that the playback devices receive the audio signals at the same time to correct the problem of multi-device out-of-sync audio playback.

Optionally, the mobile terminal obtains the transmission delay sequence of all the playback devices, obtains a minimum transmission delay in the transmission delay sequence by comparing all the transmission delays included in the transmission delay sequence, and obtains a difference value of each of the playback devices between each of the other transmission delays and the minimum transmission delay by calculating a difference value between each of the other transmission delays in the transmission delay sequence and the minimum transmission delay. Then, the mobile terminal advances time of transmitting each of the audio signals to the playback devices according to the difference value corresponding to each of the playback devices, so that the playback devices receive the audio signals at the same time to correct the problem of multi-device out-of-sync audio playback.

In order to better implement the above-mentioned method, an embodiment of the present disclosure can further provide a multi-device audio playback correction device. The multi-device audio playback correction device can be integrated in a network device, and the network device can be a device such as a terminal.

Figure 5:
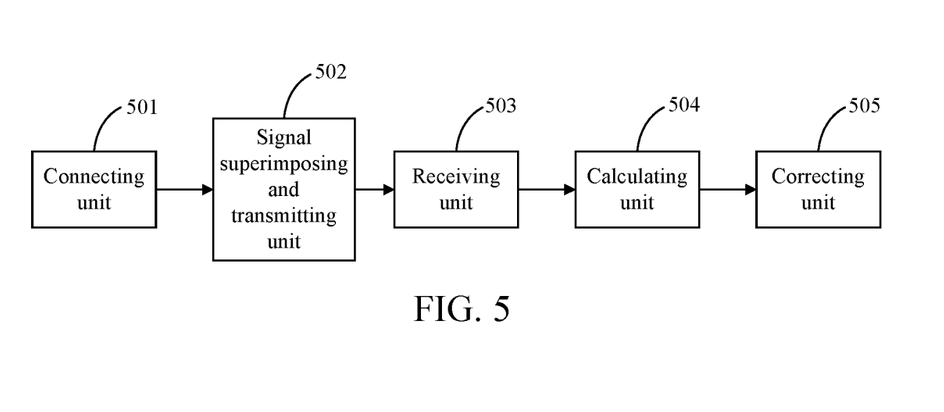
FIG. 5 illustrates a structural schematic diagram of a multi-device audio playback correction device provided by an embodiment of the present disclosure.

For example, as shown in FIG. 5, the multi-device audio playback correction device can include a connecting unit 501, a signal superimposing and transmitting unit 502, a receiving unit 503, a calculating unit 504, and a correcting unit 505.

(1) Connecting Unit 501

The connecting unit 501 is configured to connect to a plurality of playback devices and assign a corresponding sound channel to each of the playback devices.

For example, in order to make audio playback effect better, the mobile terminal adopts the connecting unit 501 to connect to the playback devices, and the connecting unit 501 is configured to assign the corresponding sound channel to each of the playback devices at the same time.

(2) Signal Superimposing And Transmitting Unit 502

The signal superimposing and transmitting unit 502 is configured to transmit superimposed audio signals to the playback devices and record one or more start transmitting time points corresponding to the playback devices.

For example, the mobile terminal adopts the signal superimposing and transmitting unit 502 to superimpose ultrasonic signals into audio signals transmitted to the playback devices to form the superimposed audio signals. Then, the signal superimposing and transmitting unit 502 is configured to transmit the superimposed audio signal to the corresponding playback devices and record the one or more start transmitting time points of the superimposed audio signal.

The signal superimposing and transmitting unit 502 includes a time-sharing transmitting unit, a simultaneous transmitting unit, and a transmitting time recording unit. The transmitting time recording unit is configured to record the one or more start transmitting time points corresponding to the playback devices.

Optionally, the time-sharing transmitting unit is configured to transmit the superimposed audio signals to the playback devices in a time-sharing manner. The time-sharing transmitting unit includes a first signal superimposing unit and a first transmitting unit. The first signal superimposing unit is configured to superimpose the ultrasonic signals into the audio signals transmitted to the playback devices to be the superimposed audio signals. The first transmitting unit is configured to transmit the superimposed audio signals to the playback devices in the time-sharing manner.

Optionally, the simultaneous transmitting unit includes a superimposing signal obtaining unit and a second transmitting unit. The superimposing signal obtaining unit is configured to obtain the superimposed audio signals. The second transmitting unit is configured to simultaneously transmit the superimposed audio signal to the playback devices. The superimposing signal obtaining unit includes an audio signal obtaining unit and a second signal superimposing unit. The audio signal obtaining unit is configured to obtain the audio signals transmitted to the playback devices. The second signal superimposing unit is configured to superimpose the ultrasonic signals with different frequencies into the audio signals to be the superimposed audio signals.

(3) Receiving Unit 503

The receiving unit 503 is configured to receive audio playback signals transmitted by the playback devices and record receiving time points corresponding to the playback devices.

For example, after receiving the superimposed audio signals, the playback devices play audio. The mobile terminal adopts the receiving unit 503 to receive the audio playback signals transmitted by the playback devices. The receiving unit 503 is configured to separate the audio signals and the ultrasonic signals from the audio playback signals. Then, the receiving unit 503 is configured to record receiving time points corresponding to the ultrasonic signals and obtain the receiving time points corresponding to the playback devices according to the audio signals of the playback devices into which the ultrasonic signals are superimposed.

Optionally, when the superimposed audio signals are transmitted to the playback devices in the time-sharing manner, the receiving unit 503 includes a time-sharing receiving unit and a time-sharing time recording unit. The time-sharing receiving unit is configured to receive one of the audio playback signals transmitted by a corresponding one of the playback devices in each time slice. The time-sharing time recording unit is configured to record the receiving time point corresponding to the one of the playback devices. The time-sharing time recording unit includes a first signal separating unit and a first time recording unit. The first signal separating unit is configured to separate a corresponding one of the audio signals and a corresponding one of the ultrasonic signals. The first time recording unit is configured to record the receiving time point of the corresponding one of the ultrasonic signals corresponding to the corresponding one of the playback devices.

Optionally, when the superimposed audio signals are simultaneously transmitted to the playback devices, the receiving unit 503 includes a simultaneous receiving unit and a simultaneous time recording unit. The simultaneous receiving unit is configured to receive the audio playback signals which the playback devices transmit simultaneously. The simultaneous time recording unit is configured to record the receiving time points corresponding to the playback devices. The simultaneous receiving unit includes a second signal separating unit. The second signal separating unit is configured to separate the ultrasonic signals superimposed into the audio playback signal according to the frequencies. The simultaneous time recording unit includes a signal corresponding unit and a second time recording unit. The signal corresponding unit is configured to obtain the receiving time points corresponding to the ultrasonic signals with the different frequencies. The second time recording unit is configured to record the receiving time points corresponding to the playback devices according to the ultrasonic signals superimposed into the audio signals.

(4) Calculating Unit 504

The calculating unit 504 is configured to obtain a transmission delay sequence corresponding to the playback devices by subtracting the one or more start transmitting time points from the receiving time points.

For example, after the mobile terminal obtains the receiving time pints of the ultrasonic signals corresponding to the playback devices and the one or more start transmitting time points of the superimposed audio signals, the calculating unit 504 is configured to obtain a transmission delay corresponding to each of the playback devices by subtracting a corresponding one of the one or more start transmitting time points of each of the playback devices from a corresponding one of the receiving time points. The calculating unit 504 is configured to obtain the transmission delay sequence corresponding to the playback devices by calculating the transmission delays of all the playback devices.

Optionally, when the superimposed audio signals are transmitted to the playback devices in the time-sharing manner, the calculating unit 504 includes a first calculating unit and a second calculating unit. In the same time slice, the transmitting time recording unit is configured to record the start transmitting time point of one of the superimposed audio signals corresponding to one of the playback devices. The receiving unit 503 is configured to record the receiving time of a corresponding one of the audio playback signals transmitted by the one of the playback devices. The first calculating unit is configured to obtain the transmission delay by subtracting the start transmitting time point from the receiving time point in this time slice. Similarly, in a next time slice, the first calculating unit is configured to obtain the transmission delay sequence corresponding to all the playback devices by obtaining the transmission delay corresponding to another playback device.

Optionally, in one time slice, the transmitting time recording unit is configured to record the start transmitting time point of one of the superimposed audio signals corresponding to one of the playback devices. The receiving unit 503 is configured to record the receiving time point of a corresponding one of the audio playback signals transmitted by the one of the playback devices. Then, in a next time slice, similarly, the transmitting time recording unit is configured to record the start transmitting time point of a corresponding one of the superimposed audio signals of another playback device. The receiving unit 503 is configured to record the receiving time point of a corresponding one of the audio playback signals transmitted by another playback device. The above-mentioned steps are repeated until the start transmitting time points corresponding to all the playback devices are obtained. The second calculating unit is configured to obtain the transmission delay sequence corresponding to the playback devices by subtracting the starting transmitting time points from the receiving time points.

(5) Correcting Unit 505

The correcting unit 505 is configured to correct an audio playback time of each of the playback devices according to the transmission delay sequence.

For example, the correction unit 505 is configured to obtain a maximum transmission delay in the transmission delay sequence by comparing all the transmission delays included in the transmission delay sequence. The correcting unit is configured to obtain a difference value of each of the playback devices between each of the other transmission delays and the maximum transmission delay by calculating a difference value between each of the other transmission delays in the transmission delay sequence and the maximum transmission delay. Then, the correcting unit 505 is configured to delay time of transmitting each of the audio signals to the playback devices according to the difference value, so that the playback devices receive the audio signals at the same time to correct the problem of multi-device out-of-sync audio playback.

Optionally, the correcting unit 505 includes a comparing unit, an obtaining unit, a difference value calculating unit, and a delaying unit. The comparing unit is configured to compare the transmission delays in the transmission delay sequence. The obtaining unit is configured to obtain the maximum transmission delay in the transmission delay sequence. The difference value calculating unit is configured to calculate the difference value between each of the transmission delays included in the transmission delay sequence and the maximum transmission delay. The delaying unit is configured to delay the time of transmitting each of the audio signals to the playback devices according to the difference value.

Specific implementations of the above-mentioned operations can be referred to the above-mentioned embodiments and are not repeated in detail herein.

The multi-device audio playback correction method and device provided by the embodiments of present disclosure are described above in detail. Although the principles and implementations of the present disclosure are described by using specific examples in this specification, the descriptions of the above-mentioned embodiments are merely intended to help understand the method and the core idea of the method of the present disclosure. In addition, those skilled in the art can make modifications to the specific implementations and application range according to the idea of the present disclosure. In conclusion, the content of this specification is not construed as a limitation to the present disclosure.

What is claimed is:

1. A multi-device audio playback correction method, comprising:

connecting to a plurality of playback devices, and assigning a corresponding sound channel to each of the playback devices;

transmitting superimposed audio signals to the playback devices, and recording one or more start transmitting time points of the superimposed audio signals transmitted to the playback devices;

receiving audio playback signals transmitted by the playback devices, and recording receiving time points of the audio playback signals transmitted by the playback devices;

obtaining a transmission delay sequence corresponding to the playback devices by subtracting the one or more start transmitting time points from the receiving time points;

correcting an audio playback time of each of the playback devices according to the transmission delay sequence;

recording frequencies of ultrasonic signals corresponding to the playback devices, wherein the frequencies of the ultrasonic signals transmitted to the playback devices are different from each other, and transmitting the superimposed audio signals to all the playback devices and recording the one or more start transmitting time points;

obtaining the transmission delay sequence of all playback devices;

comparing all transmission delays included in the transmission delay sequence;

determining a minimum transmission delay;

calculating a difference between each transmission delay in the transmission delay sequence and the minimum transmission delay; and advancing a transmission time of the superimposed audio signals to the playback devices accordingly based on the difference between each transmission delay in the transmission delay sequence and the minimum transmission delay.

2. The method of claim 1, wherein the transmitting the superimposed audio signals to the playback devices comprises:

superimposing ultrasonic signals into audio signals transmitted to the playback devices to be the superimposed audio signals; and transmitting the superimposed audio signals to the playback devices in a time-sharing manner.

3. The method of claim 2, wherein the receiving the audio playback signals transmitted by the playback devices, and the recording the receiving time points of the audio playback signals transmitted by the playback devices comprise:

in each time slice, receiving one of the audio playback signals transmitted by a corresponding one of the playback devices, separating a corresponding one of the audio signals and a corresponding one of the ultrasonic signals, and recording the receiving time point corresponding to the one of the playback devices.

4. The method of claim 3, wherein the obtaining the transmission delay sequence corresponding to the playback devices by subtracting the one or more start transmitting time points from the receiving time points comprises:

in each time slice, obtaining the transmission delay sequence corresponding to the playback devices by subtracting the one or more start transmitting time points from the receiving time points; and confirming that the receiving time points corresponding to all the playback devices are obtained, and obtaining the transmission delay sequence corresponding to the playback devices by subtracting the one or more start transmitting time points from the receiving time points.

5. The method of claim 1, wherein the transmitting the superimposed audio signals to the playback devices comprises:

transmitting the superimposed audio signals to the playback devices simultaneously.

6. The method of claim 5, wherein the transmitting the superimposed audio signals to the playback devices simultaneously comprises:

obtaining audio signals transmitted to the playback devices;

superimposing ultrasonic signals with different frequencies into the audio signals to be the superimposed audio signals; and transmitting the superimposed audio signals to the playback devices simultaneously.

7. The method of claim 6, wherein the receiving the audio playback signals transmitted by the playback devices, and the recording the receiving time points of the audio playback signals transmitted by the playback devices comprise:

separating the ultrasonic signals superimposed into the audio playback signal according to the different frequencies;

obtaining the receiving time points corresponding to the ultrasonic signals with the different frequencies; and recording the receiving time points corresponding to the playback devices according to the ultrasonic signals superimposed into the audio signals.

8. The method of claim 1, wherein the correcting the audio playback time of each of the playback devices according to the transmission delay sequence comprises:

comparing transmission delays in the transmission delay sequence;

obtaining a maximum transmission delay in the transmission delay sequence;

calculating a difference value between each of the transmission delays included in the transmission delay sequence and the maximum transmission delay; and delaying time of transmitting each audio signal to the playback devices according to the difference value.

9. A multi-device audio playback correction device, comprising:

a connecting unit configured to connect to a plurality of playback devices and assign a corresponding sound channel to each of the playback devices;

a signal superimposing and transmitting unit configured to transmit superimposed audio signals to the playback devices and record one or more start transmitting time points of the superimposed audio signals transmitted to the playback devices;

a receiving unit configured to receive audio playback signals transmitted by the playback devices and record receiving time points of the audio playback signals transmitted by the playback devices;

a calculating unit configured to obtain a transmission delay sequence corresponding to the playback devices by subtracting the one or more start transmitting time points from the receiving time points; and a correcting unit configured to correct an audio playback time of each of the playback devices according to the transmission delay sequence;

wherein the signal superimposing and transmitting unit is configured to record frequencies of ultrasonic signals corresponding to the playback devices, wherein the frequencies of the ultrasonic signals transmitted to the playback devices are different from each other, and the signal superimposing and transmitting unit is configured to transmit the superimposed audio signals to all the playback devices and record the one or more start transmitting time points;

wherein the multi-device audio playback correction device is configured to: obtain the transmission delay sequence of all playback devices, compare all transmission delays included in the transmission delay sequence, determine a minimum transmission delay; calculate a difference between each transmission delay in the transmission delay sequence and the minimum transmission delay; and advance a transmission time of the superimposed audio signals to the playback devices accordingly based on the difference between each transmission delay in the transmission delay sequence and the minimum transmission delay.

10. The device of claim 9, wherein the signal superimposing and transmitting unit comprises:
a time-sharing transmitting unit configured to transmit the superimposed audio signals to the playback devices in a time-sharing manner;
a simultaneous transmitting unit configured to simultaneously transmit the superimposed audio signal to the playback devices; and
a transmitting time recording unit configured to record the one or more start transmitting time points of the superimposed audio signals transmitted to the playback devices.

11. The device of claim 10, wherein the time-sharing transmitting unit comprises:
a first signal superimposing unit configured to superimpose ultrasonic signals into audio signals transmitted to the playback devices to be the superimposed audio signals; and
a first transmitting unit configured to transmit the superimposed audio signals to the playback devices in a time-sharing manner.

12. The device of claim 10, wherein the receiving unit comprises:
a time-sharing receiving unit configured to receive one of the audio playback signals transmitted by a corresponding one of the playback devices in each time slice; and
a time-sharing time recording unit configured to record the receiving time point corresponding to the one of the playback devices.

13. The device of claim 12, wherein the time-sharing time recording unit comprises:
a first signal separating unit separate a corresponding one of the audio signals and a corresponding one of the ultrasonic signals; and
a first time recording unit configured to record the receiving time point of the corresponding one of the ultrasonic signals corresponding to the corresponding one of the playback devices.

14. The device of claim 13, wherein the calculating unit comprises:
a first calculating unit configured to obtain the transmission delay sequence corresponding to the playback devices by subtracting the start transmitting time point from the receiving time point in each time slice; and
a second calculating unit configured to confirm that the receiving time points of all the playback devices are obtained and obtain the transmission delay sequence corresponding to the playback devices by subtracting the starting transmitting time points from the receiving time points.

15. The device of claim 10, wherein the simultaneous transmitting unit comprises:
a superimposing signal obtaining unit configured to obtain the superimposed audio signals; and
a second transmitting unit configured to simultaneously transmit the superimposed audio signal to the playback devices.

16. The device of claim 15, wherein the superimposing signal obtaining unit comprises:
an audio signal obtaining unit configured to obtain audio signals transmitted to the playback devices; and
a second signal superimposing unit configured to superimpose ultrasonic signals with different frequencies into the audio signals to be the superimposed audio signals.

17. The device of claim 16, wherein the receiving unit comprises:
a simultaneous receiving unit configured to receive the audio playback signals which the playback devices transmit simultaneously; and
a simultaneous time recording unit configured to record the receiving time points corresponding to the playback devices.

18. The device of claim 17, wherein the simultaneous receiving unit comprises:
a second signal separating unit configured to separate the ultrasonic signals superimposed into the audio playback signal according to the different frequencies.

19. The device of claim 17, wherein the simultaneous time recording unit comprises:
a signal corresponding unit configured to obtain the receiving time points corresponding to the ultrasonic signals with the different frequencies; and
a second time recording unit configured to record the receiving time points corresponding to the playback devices according to the ultrasonic signals superimposed into the audio signals.

20. The device of claim 9, wherein the correcting unit comprises:
a comparing unit configured to compare transmission delays in the transmission delay sequence;
an obtaining unit configured to obtain a maximum transmission delay in the transmission delay sequence;
a difference value calculating unit configured to calculate a difference value between each of the transmission delays included in the transmission delay sequence and the maximum transmission delay; and
a delaying unit configured to delay time of transmitting each audio signal to the playback devices according to the difference value.

* * * * *